(12) United States Patent
Yamamoto et al.

(10) Patent No.: US 11,363,573 B2
(45) Date of Patent: Jun. 14, 2022

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 59 days.

(21) Appl. No.: 16/492,937

(22) PCT Filed: Mar. 5, 2018

(86) PCT No.: PCT/JP2018/008231
§ 371 (c)(1),
(2) Date: Sep. 10, 2019

(87) PCT Pub. No.: WO2018/203438
PCT Pub. Date: Nov. 8, 2018

(65) Prior Publication Data
US 2020/0022133 A1 Jan. 16, 2020

(30) Foreign Application Priority Data
May 1, 2017 (JP) .............................. JP2017-091099

(51) Int. Cl.
*H04W 72/04* (2009.01)
*H04W 52/14* (2009.01)
(Continued)

(52) U.S. Cl.
CPC ..... *H04W 72/0413* (2013.01); *H04W 52/146* (2013.01); *H04W 52/325* (2013.01); *H04W 52/346* (2013.01); *H04W 72/0446* (2013.01)

(58) Field of Classification Search
CPC .......... H04W 72/0413; H04W 52/146; H04W 52/325; H04W 52/346
See application file for complete search history.

(56) References Cited

U.S. PATENT DOCUMENTS

2013/0195048 A1* 8/2013 Ekpenyong ......... H04W 52/325
370/329
2018/0035416 A1* 2/2018 Yi ..................... H04W 72/0406
(Continued)

OTHER PUBLICATIONS

International Search Report of PCT application No. PCT/JP2018/008231 dated May 22, 2018.
(Continued)

*Primary Examiner* — Kevin M Cunningham
(74) *Attorney, Agent, or Firm* — Seed IP Law Group LLP

(57) ABSTRACT

In a terminal, in a case where the sum of the transmission power for a first signal and the transmission power for a second signal that requires lower latency and higher reliability than the first signal exceeds the maximum transmission power in an overlap interval in which a transmission of the first signal and a transmission of the second signal occur at the same time, a control unit carries out power scaling with the quality of the second signal being prioritized over the quality of the first signal, in at least the overlap interval. A transmission unit transmits the first signal and the second signal obtained after the power scaling.

20 Claims, 10 Drawing Sheets

(51) Int. Cl.
*H04W 52/32* (2009.01)
*H04W 52/34* (2009.01)

(56) References Cited

U.S. PATENT DOCUMENTS

2018/0063858 A1* 3/2018 Au .................... H04L 5/0048
2018/0103428 A1* 4/2018 Jiang ................. H04W 72/042
2018/0310257 A1* 10/2018 Papasakellariou ..........................
                                                  H04W 72/1289
2020/0008227 A1* 1/2020 Lee ................... H04L 1/1861

OTHER PUBLICATIONS

3GPP TS 36.211 V13.4.0, "3rd Generation Partnership Project; Technical Specification Group Radio Access Network; Evolved Universal Terrestrial Radio Access (E-UTRA); Physical channels and modulation (Release 13)", Dec. 2016.

3GPP TS 36.212 V13.4.0, "3rd Generation Partnership Project; Technical Specification Group Radio Access Network; Evolved Universal Terrestrial Radio Access (E-UTRA); Multiplexing and channel coding (Release 13)", Dec. 2016.

3GPP TS 36.213 V13.4.0, "3rd Generation Partnership Project; Technical Specification Group Radio Access Network; Evolved Universal Terrestrial Radio Access (E-UTRA); Physical layer procedures (Release 13)", Dec. 2016.

3GPP TSG RAN WG1 Meeting #88, R1-1702995, "Power Control for Multiplexing of eMBB and URLLC", Feb. 2017.

3GPP TSG RAN WG1 Meeting #88, R1-1701666, "On UL multiplexing of URLLC and eMBB transmissions", Feb. 2017.

3GPP TSG RAN WG1 Meeting #88, R1-1702489, "Discussion on multiplexing of eMBB and URLLC for uplink", Feb. 2017.

* cited by examiner

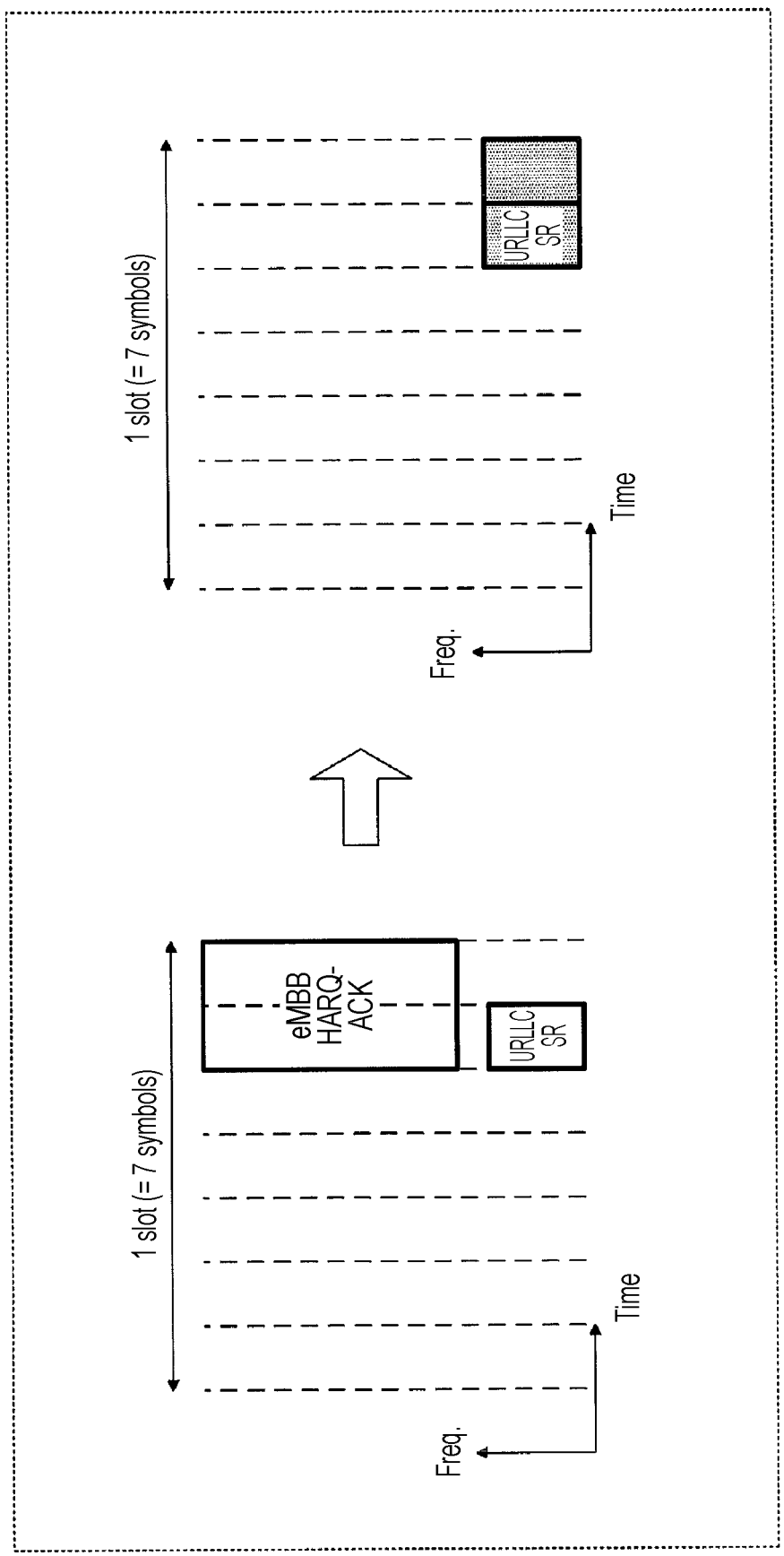

TERMINAL AND COMMUNICATION METHOD

TECHNICAL FIELD

The present disclosure relates to a terminal and a communication method.

BACKGROUND ART

With the spread of services using mobile broadband in recent years, data traffic in mobile communication has continued to increase exponentially, and looking forward there is a pressing need to expand data transmission capacities. Furthermore, in the future, dramatic developments are anticipated for the IoT (Internet of Things) in which all "things" are connected via the Internet. To support the diversification of services by means of the IoT, dramatic advancements are needed not only for data transmission capacity but also for various requirements such as low latency and communication area (coverage). With this background, progress is being made in the technical development/standardization of the fifth-generation mobile communication system (5G), which considerably improves performance and function compared to the fourth-generation mobile communication system (4G).

In the 3GPP (Third Generation Partnership Project), in the standardization of 5G, progress is being made in the technical development of new radio access technology (NR: new radio) that does not always have backward compatibility with LTE (Long Term Evolution)-Advanced (for example, see NPL 1 to 3).

In NR, it is necessary to handle not only further advancements in mobile broadband (eMBB: enhanced mobile broadband) but also support for massive MTC (mMTC: machine type communication) terminals and diversification of services or use cases such as ultra-reliable and low latency communication (URLLC).

Furthermore, in NR, consideration is being given to a terminal (UE: user equipment) transmitting a response signal (ACK/NACK: acknowledgment/negative acknowledgment or HARQ-ACK) indicating an error detection result for downlink data, channel state information (CSI) for a downlink, and a radio resource allocation request (SR: scheduling request) for an uplink, to a base station (eNB or gNB) using an uplink control channel (PUCCH: physical uplink control channel).

Furthermore, in NR, consideration is being given to transmitting one to two bit UCI (uplink control information) included in a PUCCH.

CITATION LIST

Non Patent Literature

NPL 1: 3GPP TS 36.211 V13.4.0, "Evolved Universal Terrestrial Radio Access (E-UTRA); Physical channels and modulation (Release 13)", December 2016.

NPL 2: 3GPP TS 36.212 V13.4.0, "Evolved Universal Terrestrial Radio Access (E-UTRA); Multiplexing and channel coding (Release 13)", December 2016.

NPL 3: 3GPP TS 36.213 V13.4.0, "Evolved Universal Terrestrial Radio Access (E-UTRA); Physical layer procedures (Release 13)", December 2016.

SUMMARY OF INVENTION

However, in NR, consideration is not being sufficiently given to a method for controlling radio resources (time, frequency, or transmission power) for a plurality of UCIs transmitted at the same time by means of PUCCHs, in accordance with the conditions required for the diversified services or use cases.

An embodiment of the present disclosure facilitates providing a terminal and a communication method with which it is possible to appropriately carry out radio resource control for a plurality of UCIs transmitted at the same time by means of PUCCHs.

A terminal according to an embodiment of the present disclosure is provided with: a circuit that, in a case where the sum of the transmission power for a first signal and the transmission power for a second signal requiring lower latency and higher reliability than the first signal exceeds the maximum transmission power in an overlap interval in which a transmission of the first signal and a transmission of the second signal occur at the same time, carries out power scaling with the quality of the second signal being prioritized over the quality of the first signal, in at least the overlap interval; and a transmitter that transmits the first signal and the second signal obtained after the power scaling.

A communication method according to an embodiment of the present disclosure includes: in a case where the sum of the transmission power for a first signal and the transmission power for a second signal requiring lower latency and higher reliability than the first signal exceeds the maximum transmission power in an overlap interval in which a transmission of the first signal and a transmission of the second signal occur at the same time, carrying out power scaling with the quality of the second signal being prioritized over the quality of the first signal, in at least the overlap interval; and transmitting the first signal and the second signal obtained after the power scaling.

It should be noted that general or specific embodiments hereof may be realized by a system, a method, an integrated circuit, a computer program, or a recording medium, and may be realized by an arbitrary combination of a system, a device, a method, an integrated circuit, a computer program, and a recording medium.

According to an embodiment of the present disclosure, it is possible to appropriately carry out radio resource control for a plurality of UCIs transmitted at the same time by means of PUCCHs.

Additional benefits and advantages in an embodiment of the present disclosure will be made apparent from the specification and figures. The benefits and/or advantages may each be provided by several of the embodiments and the features disclosed in the specification and figures, and need not all be provided in order to obtain one or more of the same features.

BRIEF DESCRIPTION OF DRAWINGS

FIG. 10 depicts an example of transmission control according to a modified example of embodiment 3.

DESCRIPTION OF EMBODIMENTS

Hereinafter, embodiments of the present disclosure will be described in detail with reference to the drawings.

An SR is control information that indicates whether or not a terminal requests the allocation of a radio resource for an uplink data transmission.

As required conditions for URLLC defined by 3GPP, it is necessary to guarantee user plane latency of 0.5 ms or less one way and constant reliability and to achieve latency of 1 ms or less.

In order to satisfy the aforementioned required conditions for URLLC, it is necessary for a terminal to transmit an SR (hereinafter referred to as an "URLLC SR") every 0.125 ms. That is, it is necessary for an SR resource period (transmission period: URLLC SR periodicity) to be 0.125 ms or less. Furthermore, it is also necessary to ensure the reliability of SRs. Here, a URLLC SR is an SR for data for which low latency is required or data for which constant reliability is required.

Furthermore, it is assumed that an NR terminal is compatible with a plurality of services (eMBB, URLLC, mMTC, or the like).

For example, a terminal uses a PUCCH to transmit a response signal (hereinafter referred to as an "eMBB HARQ-ACK") that indicates an error detection result for eMBB downlink data. At such time, in the terminal, a transmission of a URLLC SR and a transmission of an eMBB HARQ-ACK occur at the same time, as depicted in FIG. 1.

Figure 1:
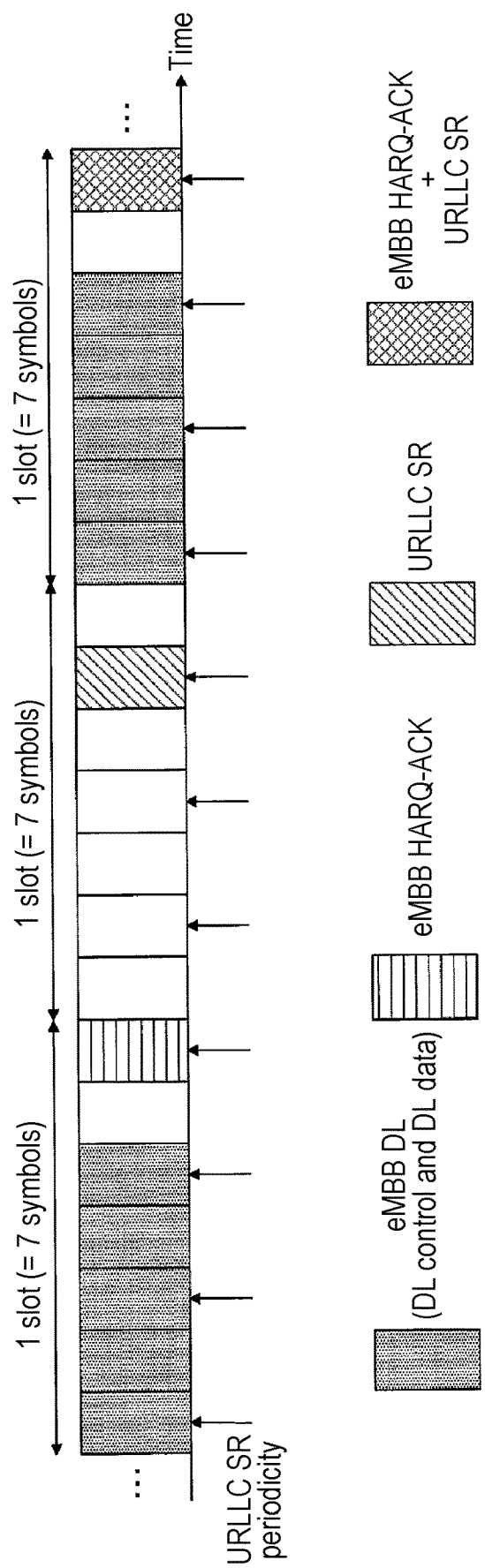
FIG. 1 depicts an example of transmitting a URLLC SR and an eMBB HARQ-ACK.

It should be noted that, in FIG. 1, slots (also referred to as "NR slots") are assumed for which the subcarrier spacing is 15 kHz and one slot is configured of seven symbols (0.5 ms). Furthermore, in FIG. 1, a URLLC SR transmission period is two symbols 0.125 ms) and an eMBB scheduling period is one slot (0.5 ms).

Here, in LTE, a resource for a PUCCH for the terminal to transmit an HARQ-ACK (hereinafter referred to as a "HARQ-ACK resource") and a resource for a PUCCH for transmitting an SR (hereinafter referred to as an "SR resource") are each ensured. In a case where there is no transmission of an SR, the terminal transmits an HARQ-ACK using an HARQ-ACK resource. However, in a case where a transmission of an SR and a transmission of an HARQ-ACK have occurred at the same time, the terminal transmits the HARQ-ACK using the SR resource. Furthermore, in a case where there is no transmission of an HARQ-ACK and there is a transmission of an SR, the terminal transmits the SR using the SR resource. It should be noted that in the case where there is no transmission of an HARQ-ACK and there is a transmission of an SR, the terminal transmits the SR at the same signal point as a NACK.

The base station determines a resource with which an HARQ-ACK is being transmitted, by means of blind detection such as power determination. For example, when having determined that an HARQ-ACK is being transmitted by means of an SR resource, the base station determines that an SR is present and carries out decoding of the HARQ-ACK using an SR resource signal. However, when having determined that an HARQ-ACK is being transmitted by means of an HARQ-ACK resource, the base station determines that an SR is not present and carries out decoding of the HARQ-ACK using an HARQ-ACK resource signal.

Furthermore, in LTE, the terminal does not transmit (drops) an SR in a case where the transmission of the SR has occurred in an interval in which repetition transmission, the same HARQ-ACK being repeatedly transmitted across a plurality of subframes, is being carried out. This is because, in LTE, the priority of an HARQ-ACK for downlink data has been made higher than an SR for uplink data due to there being a lack of downlink resources and a need to improve downlink frequency utilization efficiency.

In a method in which a PUCCH resource that transmits a signal is altered according to whether or not there is a transmission of an SR and whether or not there is a transmission of an HARQ-ACK in LTE such as the aforementioned, blind detection in the base station is necessary and ambiguity in SR detection increases.

In contrast, in NR, it is necessary to support a URLLC SR, and low latency and high reliability are required in a URLLC SR. It is therefore necessary for ambiguity in URLLC SR detection in the base station to be reduced.

Furthermore, NR supports a "short PUCCH" in which a PUCCH is transmitted using one or two symbols within one slot, and a "long PUCCH" in which a PUCCH is transmitted using three or more symbols (for example, there may be four symbols as the minimum number of symbols).

Thus, in NR, a case is assumed in which the number of symbols of a PUCCH that transmits an eMBB HARQ-ACK is greater than the number of symbols of a PUCCH that transmits a URLLC SR. For example, a case is assumed in which a terminal transmits a URLLC SR by means of a short PUCCH having one symbol, and transmits an eMBB HARQ-ACK by means of a short PUCCH having two symbols or a long PUCCH having three or more symbols, or the like.

At such time, similar to the repetition transmission of an HARQ-ACK in LTE mentioned above, if a URLLC SR is dropped in a case where a URLLC SR has occurred in an interval in which an eMBB HARQ-ACK is being transmitted, there is a possibility of the required condition of low latency for URLLC no longer being satisfied.

Furthermore, there is a limit to the maximum transmission power of a terminal depending on the performance or the like of the RF (radio frequency) circuit provided in the terminal. It is necessary for the terminal to carry out transmission power control (for example, power scaling or the like) in order to suppress the transmission power to be less than or equal to the maximum transmission power in a case where the sum of the transmission power for PUCCHs transmitting a plurality of UCIs exceeds the maximum transmission power. Thus, in a case where a transmission of a URLLC SR and a transmission of an eMBB HARQ-ACK occur at the same time such as the aforementioned, it is necessary for transmission power control to be carried out appropriately for each UCI (namely the URLLC SR and the eMBB HARQ-ACK) while satisfying the required conditions for URLLC.

Thus, in an embodiment of the present disclosure, a description will be given regarding a method for appropriately carrying out radio resource (time, frequency, or transmission power) control in a PUCCH transmission, and efficiently realizing simultaneous transmission of PUCCHs for services and use cases having different required conditions, with consideration being given to the conditions required for data transmission corresponding to a signal (UCI) transmitted by means of a PUCCH.

Hereinafter, embodiments will be described in detail.

Embodiment 1

[Overview of Communication System]

The communication system according to each embodiment of the present disclosure is provided with a base station 100 and a terminal 200.

Figure 2:
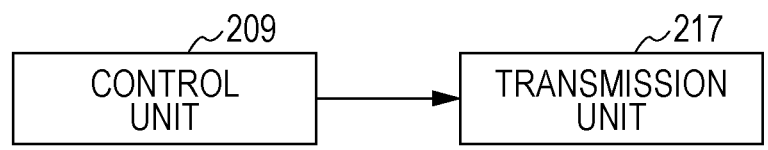
FIG. 2 depicts the configuration of a portion of a terminal according to embodiment 1.

FIG. 2 is a block diagram depicting the configuration of a portion of the terminal 200 according to each embodiment of the present disclosure. In the terminal 200 depicted in FIG. 2, in a case where the sum of the transmission power for a first signal (for example, an eMBB HARQ-ACK) and the transmission power for a second signal (for example, a URLLC SR) that requires lower latency and higher reliability than the first signal exceeds the maximum transmission power in an overlap interval in which a transmission of the first signal and a transmission of the second signal occur at the same time, a control unit 209 carries out power scaling with the quality of the second signal being prioritized over the quality of the first signal, in at least the overlap interval. A transmission unit 217 transmits the first signal and the second signal obtained after the power scaling.

[Configuration of Base Station]

Figure 3:
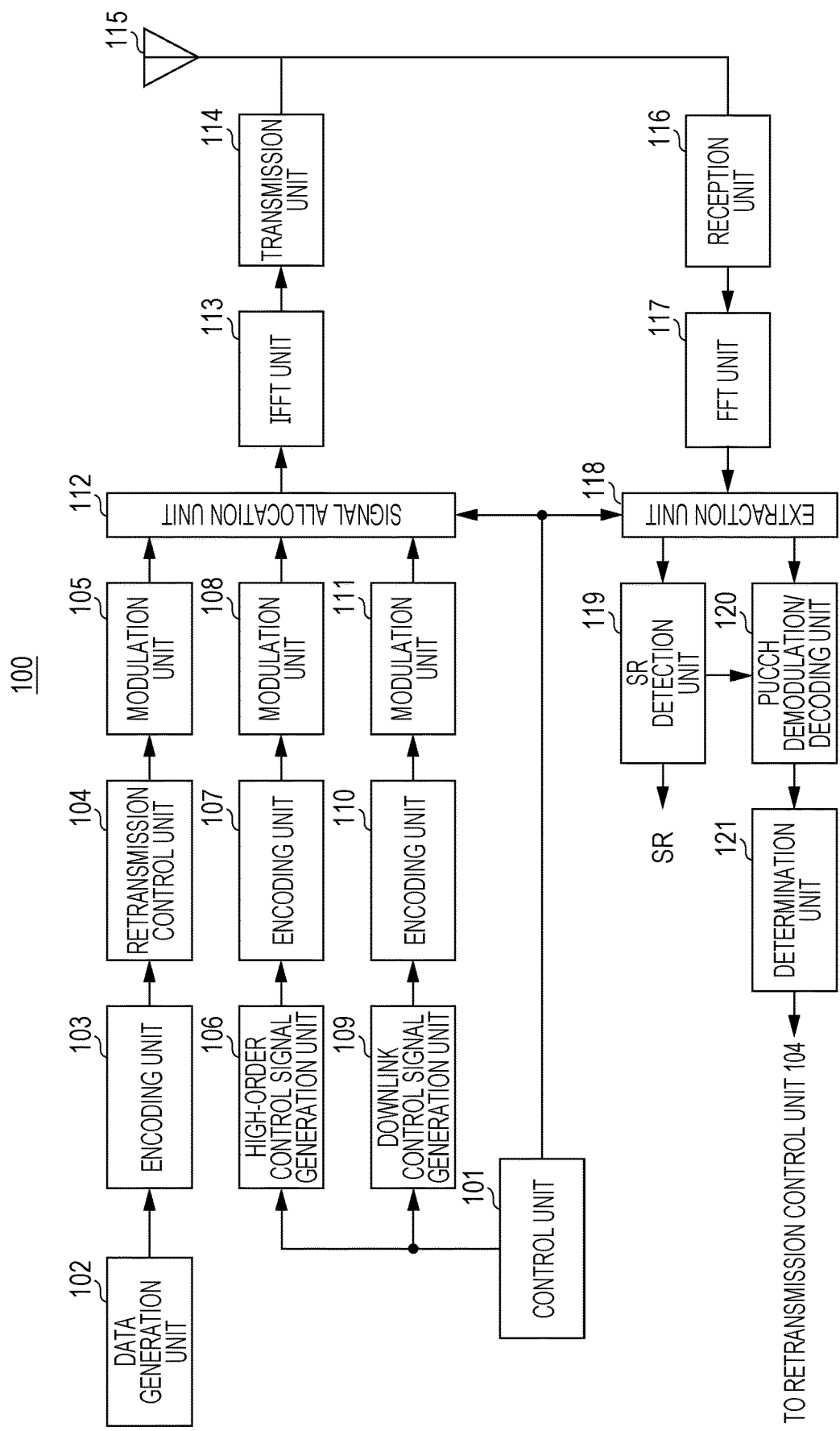
FIG. 3 depicts the configuration of a base station according to embodiment 1.

FIG. 3 is a block diagram depicting the configuration of the base station 100 according to embodiment 1 of the present disclosure. In FIG. 3, the base station 100 has a control unit 101, a data generation unit 102, an encoding unit 103, a retransmission control unit 104, a modulation unit 105, a higher layer control signal generation unit 106, an encoding unit 107, a modulation unit 108, a downlink control signal generation unit 109, an encoding unit 110, a modulation unit 111, a signal allocation unit 112, an IFFT (inverse fast Fourier transform) unit 113, a transmission unit 114, an antenna 115, a reception unit 116, an FFT (fast Fourier transform) unit 117, an extraction unit 118, an SR detection unit 119, a PUCCH demodulation/decoding unit 120, and a determination unit 121.

The control unit 101 decides the allocation of a radio resource for a downlink signal (for example, a PDSCH: physical downlink shared channel), and outputs downlink resource allocation information that instructs the allocation of a resource for the downlink signal, to the downlink control signal generation unit 109 and the signal allocation unit 112.

Furthermore, the control unit 101 decides the allocation of a radio resource (time, frequency, coding, or the like) for a PUCCH that transmits an HARQ-ACK signal with respect to the downlink signal, and outputs PUSCH resource allocation information that instructs the allocation of a PUSCH resource for the HARQ-ACK, to the downlink control signal generation unit 109 and the extraction unit 118.

Furthermore, the control unit 101 decides the allocation of a radio resource for a PUCCH that transmits an SR, and outputs PUCCH resource allocation information that instructs the allocation of a PUCCH resource (time (in some cases also includes the period), frequency, coding, or the like) for the SR, to the higher layer control signal generation unit 106 and the extraction unit 118.

Furthermore, the control unit 101 decides information relating to transmission power control for PUCCHs, and outputs the decided information to the higher layer control signal generation unit 106 or the downlink control signal generation unit 109.

The data generation unit 102 generates downlink data for the terminal 200, and outputs the downlink data to the encoding unit 103.

The encoding unit 103 carries out error correction encoding on the downlink data that is input from the data generation unit 102, and outputs an encoded data signal to the retransmission control unit 104.

The retransmission control unit 104, at the time of the first transmission, retains the encoded data signal that is input from the encoding unit 103, and also outputs the encoded data signal to the modulation unit 105. Furthermore, the retransmission control unit 104 outputs corresponding retained data to the modulation unit 105 when a NACK for a transmitted data signal is input from the determination unit 121 described later.

Meanwhile, the retransmission control unit 104 deletes corresponding retained data when an ACK for a transmitted data signal is input from the determination unit 121.

The modulation unit 105 modulates the data signal that is input from the retransmission control unit 104, and outputs a modulated data signal to the signal allocation unit 112.

The higher layer control signal generation unit 106 generates a control information bit string using control information that is input from the control unit 101 (PUCCH resource allocation information for an SR, or the like), and outputs the generated control information bit string to the encoding unit 107.

The encoding unit 107 carries out error correction encoding on the control information bit string that is input from the higher layer control signal generation unit 106, and outputs an encoded control signal to the modulation unit 108.

The modulation unit 108 modulates the control signal that is input from the encoding unit 107, and outputs a modulated control signal to the signal allocation unit 112.

The downlink control signal generation unit 109 generates a downlink control information bit string using control information that is input from the control unit 101 (PUCCH resource allocation information for an HARQ-ACK, downlink resource allocation information, or the like), and outputs the generated control information bit string to the encoding unit 110. It should be noted that, since control information is sometimes transmitted to a plurality of terminals, the downlink control signal generation unit 109 may generate bit strings with the terminal ID of each terminal being included in the control information for each terminal.

The encoding unit 110 carries out error correction encoding on the control information bit string that is input from the downlink control signal generation unit 109, and outputs an encoded control signal to the modulation unit 111.

The modulation unit 111 modulates the control signal that is input from the coding unit 110, and outputs a modulated control signal to the signal allocation unit 112.

The signal allocation unit 112 maps the data signal that is input from the modulation unit 105 to a radio resource indicated in the downlink resource allocation information that is input from the control unit 101. Furthermore, the signal allocation unit 112 maps the control signal that is input from the modulation unit 108 or the modulation unit 111 to a radio resource. The signal allocation unit 112 outputs a downlink signal for which signal mapping has been carried out, to the IFFT unit 113.

The IFFT unit 113 carries out transmission waveform generation processing such as OFDM (orthogonal frequency division multiplexing) on signals that are input from the signal allocation unit 112. The IFFT unit 113 adds a CP (cyclic prefix) in the case of an OFDM transmission in which a CP is to be added (not depicted). The IFFT unit 113 outputs the generated transmission waveform to the transmission unit 114.

The transmission unit 114 carries out RF (radio frequency) processing such as D/A (digital-to-analog) conversion or up-conversion on a signal that is input from the IFFT unit 113, and transmits a radio signal to the terminal 200 via the antenna 115.

The reception unit 116 carries out RF processing such as down-conversion or A/D (analog-to-digital) conversion on an uplink signal waveform from the terminal 200 received via the antenna 115, and outputs the uplink signal waveform having been subjected to reception processing to the FFT unit 117.

The FFT unit 117 carries out FFT processing in which a time domain signal is converted into a frequency domain signal, on the uplink signal waveform that is input from the reception unit 116. The FFT unit 117 outputs a frequency domain signal obtained by the FFT processing to the extraction unit 118.

The extraction unit 118 extracts a radio resource portion of a PUCCH for an SR or an HARQ-ACK, from the signal that is input from the FFT unit 117, on the basis of information received from the control unit 101 (PUCCH resource allocation information or the like), and outputs extracted radio resource components to the SR detection unit 119 and the PUCCH demodulation/decoding unit 120 respectively.

The SR detection unit 119 carries out power detection on a signal that is input from the extraction unit 118, and detects whether or not an SR is present. Furthermore, when having detected that an HARQ-ACK is being transmitted by means of an SR resource, the SR detection unit 119 outputs the signal that is input from the extraction unit 118 to the PUCCH demodulation/decoding unit 120.

The PUCCH demodulation/decoding unit 120 carries out equalization, demodulation, and error correction decoding on a PUCCH signal that is input from the extraction unit 118 or the SR detection unit 119, and outputs a decoded bit sequence to the determination unit 121.

The determination unit 121 determines whether an HARQ-ACK signal transmitted from the terminal 200 indicates an ACK or NACK with respect to a transmitted data signal, on the basis of the bit sequence that is input from the PUCCH demodulation/decoding unit 120. The determination unit 121 outputs a determination result to the retransmission control unit 104.

[Configuration of Terminal]

Figure 4:
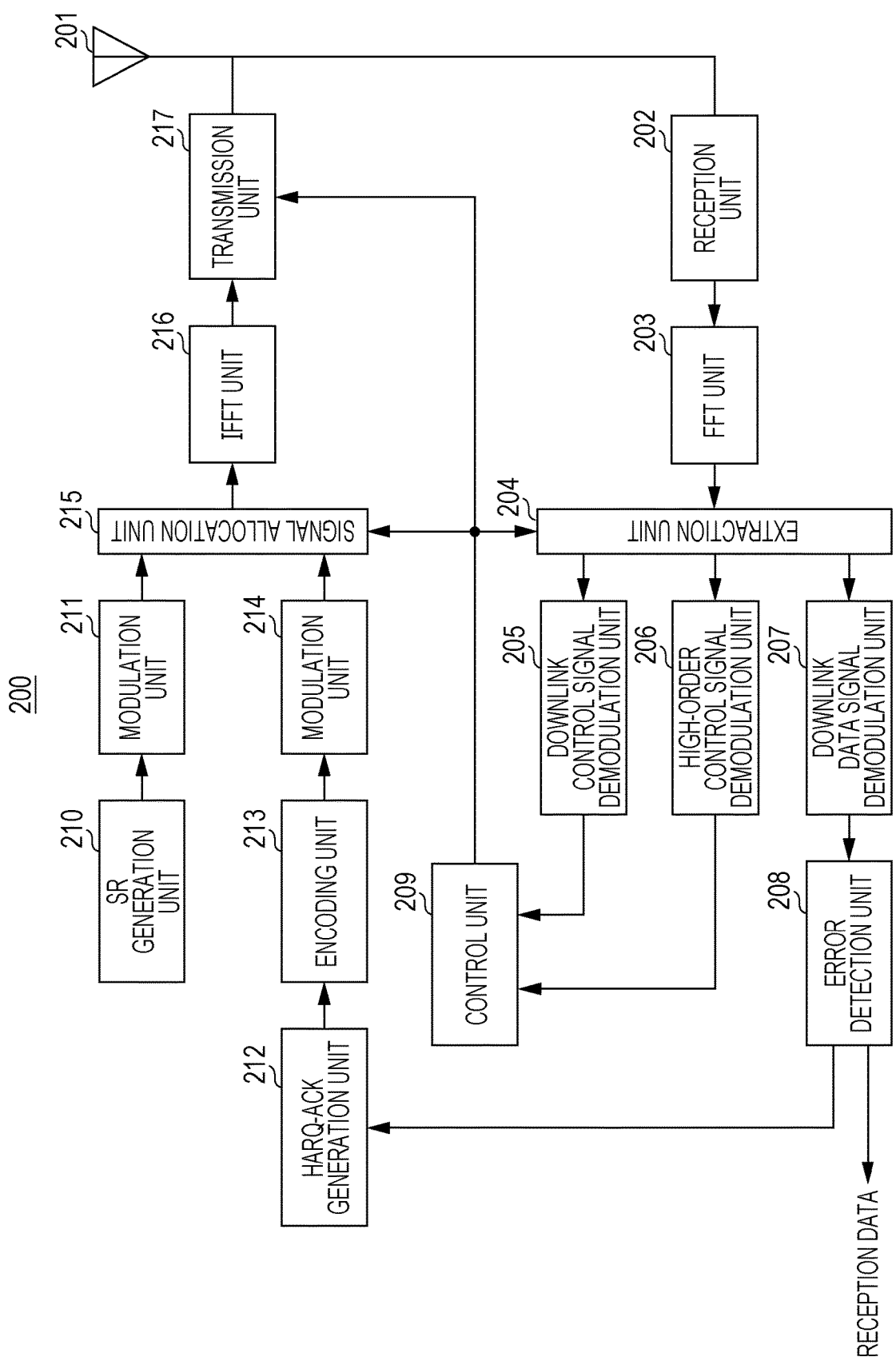
FIG. 4 depicts the configuration of the terminal according to embodiment 1.

FIG. 4 is a block diagram depicting the configuration of the terminal 200 according to embodiment 1 of the present disclosure. In FIG. 4, the terminal 200 has an antenna 201, a reception unit 202, an FFT unit 203, an extraction unit 204, a downlink control signal demodulation unit 205, a higher layer control signal demodulation unit 206, a downlink data signal demodulation unit 207, an error detection unit 208, the control unit 209, an SR generation unit 210, a modulation unit 211, an HARQ-ACK generation unit 212, an encoding unit 213, a modulation unit 214, a signal allocation unit 215, an IFFT unit 216, and the transmission unit 217.

The reception unit 202 carries out RF processing such as down-conversion or ND (analog-to-digital) conversion with respect to the signal waveform of a downlink signal (data signal or control signal) from the base station 100 received via the antenna 201, and outputs an obtained reception signal (baseband signal) to the FFT unit 203.

The FFT unit 203 carries out FFT processing in which a time domain signal is converted into a frequency domain signal, on the signal (time domain signal) that is input from the reception unit 202. The FFT unit 203 outputs a frequency domain signal obtained by the FFT processing to the extraction unit 204.

The extraction unit 204 extracts a downlink control signal from the signal that is input from the FFT unit 203, on the basis of control information that is input from the control unit 209, and outputs the downlink control signal to the downlink control information demodulation unit 205. Furthermore, the extraction unit 204 extracts a higher layer control signal and a downlink data signal on the basis of control information that is input from the control unit 209, outputs the higher layer control signal to the higher layer control signal demodulation unit 206, and outputs the downlink data signal to the downlink data signal demodulation unit 207.

The downlink control information demodulation unit 205 carries out blind decoding on the downlink control signal that is input from the extraction unit 204, and, if having determined that the downlink control signal is a control signal addressed thereto, demodulates and outputs the control signal to the control unit 209.

The higher layer control signal demodulation unit 206 demodulates the higher layer control signal that is input from the extraction unit 204, and outputs a demodulated higher layer control signal to the control unit 209.

The downlink data signal demodulation unit 207 demodulates/decodes the downlink data signal that is input from the extraction unit 204, and outputs a decoded downlink data signal to the error detection unit 208.

The error detection unit 208 carries out error detection on the downlink data that is input from the downlink data signal demodulation unit 207, and outputs the error detection result to the HARQ-ACK generation unit 212. Furthermore, the error detection unit 208 outputs, as reception data, downlink data determined as having no errors as a result of the error detection.

The control unit 209 calculates the allocation of a radio resource for a downlink data signal on the basis of downlink resource allocation information indicated in the control signal that is input from the downlink control signal demodulation unit 205, and outputs information indicating the calculated radio resource allocation to the extraction unit 204.

Furthermore, the control unit 209 calculates a PUCCH resource with which an SR is transmitted and a PUCCH resource with which an HARQ-ACK is transmitted, on the basis of information relating to the allocation of resources for PUCCHs for an SR and an HARQ-ACK, using the higher layer control signal that is input from the higher layer control signal demodulation unit 206, and the control signal that is input from the downlink control signal demodulation unit 205. The control unit 209 then outputs information relating to the calculated PUCCH resources to the signal allocation unit 215.

Furthermore, the control unit 209 decides the transmission power and time/frequency resources for the PUCCHs with which the terminal 200 actually transmits the SR and the HARQ-ACK, by means of a method described later, and outputs the decided information to the transmission unit 217.

The SR generation unit 210 generates an SR (for example, a URLLC SR) in a case where the terminal 200 requests the base station 100 for the allocation of a radio resource for uplink transmission, and outputs the generated SR signal to the modulation unit 211.

The modulation unit 211 modulates the SR signal that is input from the SR generation unit 210, and outputs the modulated SR signal to the signal allocation unit 215.

The HARQ-ACK generation unit 212 generates an HARQ-ACK signal (ACK or NACK) for the received downlink data, on the basis of an error detection result that is input from the error detection unit 208. The HARQ-ACK generation unit 212 outputs the generated HARQ-ACK signal (bit sequence) to the encoding unit 213.

The encoding unit 213 carries out error correction encoding on the bit sequence that is input from the HARQ-ACK generation unit 212, and outputs the encoded bit sequence (HARQ-ACK signal) to the modulation unit 214.

The modulation unit 214 modulates the HARQ-ACK signal that is input from the coding unit 213, and outputs the modulated HARQ-ACK signal to the signal allocation unit 215.

The signal allocation unit 215 maps the SR signal that is input from the modulation unit 211, or the HARQ-ACK signal that is input from the modulation unit 214, to a radio resource instructed from the control unit 209. The signal allocation unit 215 outputs an uplink signal for which signal mapping has been carried out, to IFFT unit 216.

The IFFT unit 216 carries out transmission waveform generation processing such as OFDM on the signal that is input from the signal allocation unit 215. The IFFT unit 216 adds a CP (cyclic prefix) in the case of an OFDM transmission in which a CP is to be added (not depicted). Alternatively, in a case where the IFFT unit 216 is to generate a single carrier waveform, a DFT (discrete Fourier transform) unit may be added at a stage prior to the signal allocation unit 215 (not depicted). The IFFT unit 216 outputs the generated transmission waveform to the transmission unit 217.

The transmission unit 217 carries out RF (radio frequency) processing such as transmission power control, D/A (digital-to-analog) conversion, or up-conversion that is based on information input from the control unit 209, on the signal that is input from the IFFT unit 216, and transmits a radio signal to the base station 100 via the antenna 201.

[Operation of Base Station 100 and Terminal 200]

A detailed description will be given regarding an operation in the base station 100 and the terminal 200 having the above configurations.

Figure 5:
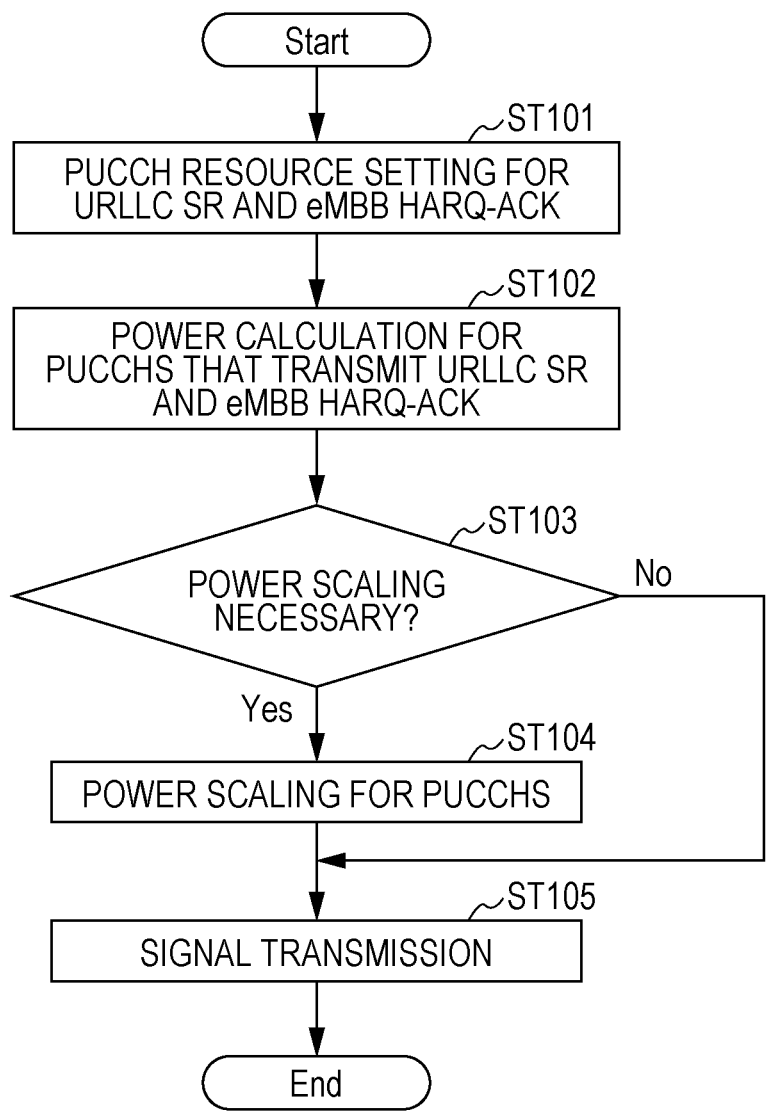
FIG. 5 depicts processing carried out by the terminal according to embodiment 1.

FIG. 5 depicts a flow of the processing carried out by the terminal 200 according to the present embodiment.

As mentioned above, short PUCCHs and long PUCCHs are supported in NR. In the present embodiment, it is assumed that some or all of a transmission interval for a URLLC SR and a transmission interval for an eMBB HARQ-ACK overlap.

Figure 6:
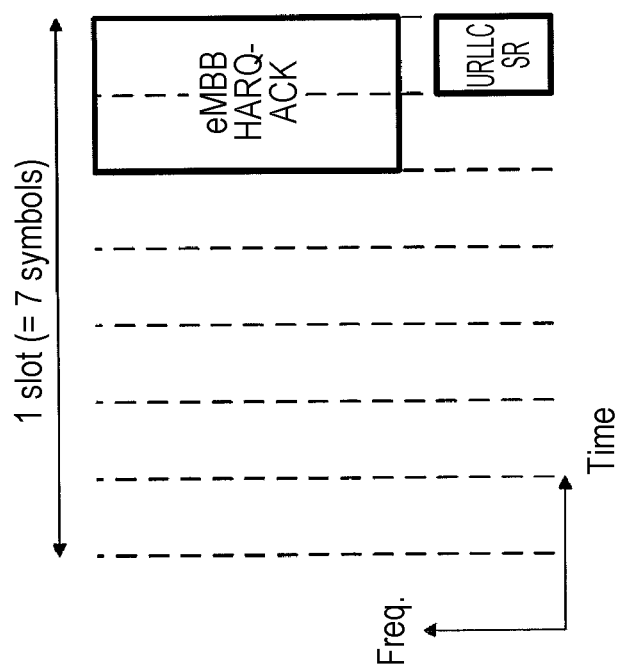
FIG. 6 depicts an example of resource allocation for a URLLC SR and an eMBB HARQ-ACK according to embodiment 1.

In this case, there are cases where there occur symbols (overlap intervals) in which a transmission of a URLLC SR and a transmission of an eMBB HARQ-ACK overlap (that is, a transmission of a URLLC SR and a transmission of an eMBB HARQ-ACK occur at the same time), as depicted in FIG. 1. Furthermore, there are also cases where a transmission interval for a URLLC SR and a transmission interval for an eMBB HARQ-ACK partially overlap, as depicted in FIG. 6.

The terminal 200 sets PUCCH resources to which the URLLC SR and the eMBB HARQ-ACK are respectively allocated (ST101). For example, in the present embodiment, it is assumed that the URLLC SR and the eMBB HARQ-ACK are allocated to different PUCCH resources, as depicted in FIG. 6. That is, in a case where a transmission of a URLLC SR and a transmission of an eMBB HARQ-ACK have occurred at the same time (in the same symbol), the terminal 200 simultaneously transmits a plurality of UCIs (namely, the URLLC SR and the eMBB HARQ-ACK) allocated to different PUCCH resources. In other words, in the present embodiment, it is assumed that the terminal 200 transmits a plurality of PUCCHs (the URLLC SR and the eMBB HARQ-ACK) that are within the same slot by means of FDM (frequency division multiplexing).

Furthermore, the terminal 200 calculates the transmission power for each of the PUCCH that transmits the URLLC SR and the PUCCH that transmits the eMBB HARQ-ACK (ST102). It should be noted that, as a specific method for calculating transmission power, with LTE-Advanced as an example, the transmission power calculation formula for a PUCCH described in NPL 3 may be used.

Next, the terminal 200 calculates the sum of the transmission power (total transmission power) from transmission power values of the PUCCHs for each of the URLLC SR and the eMBB HARQ-ACK, and determines whether or not power scaling is required by comparing the calculated total transmission power and the maximum transmission power ($P_{max}$) specific to the terminal (ST103).

The terminal 200 determines that "power scaling is not required" in a case where the total transmission power is less than or equal to the maximum transmission power specific to the terminal. However, the terminal 200 determines that "power scaling is required" in a case where the total transmission power exceeds the maximum transmission power specific to the terminal.

Figure 7:
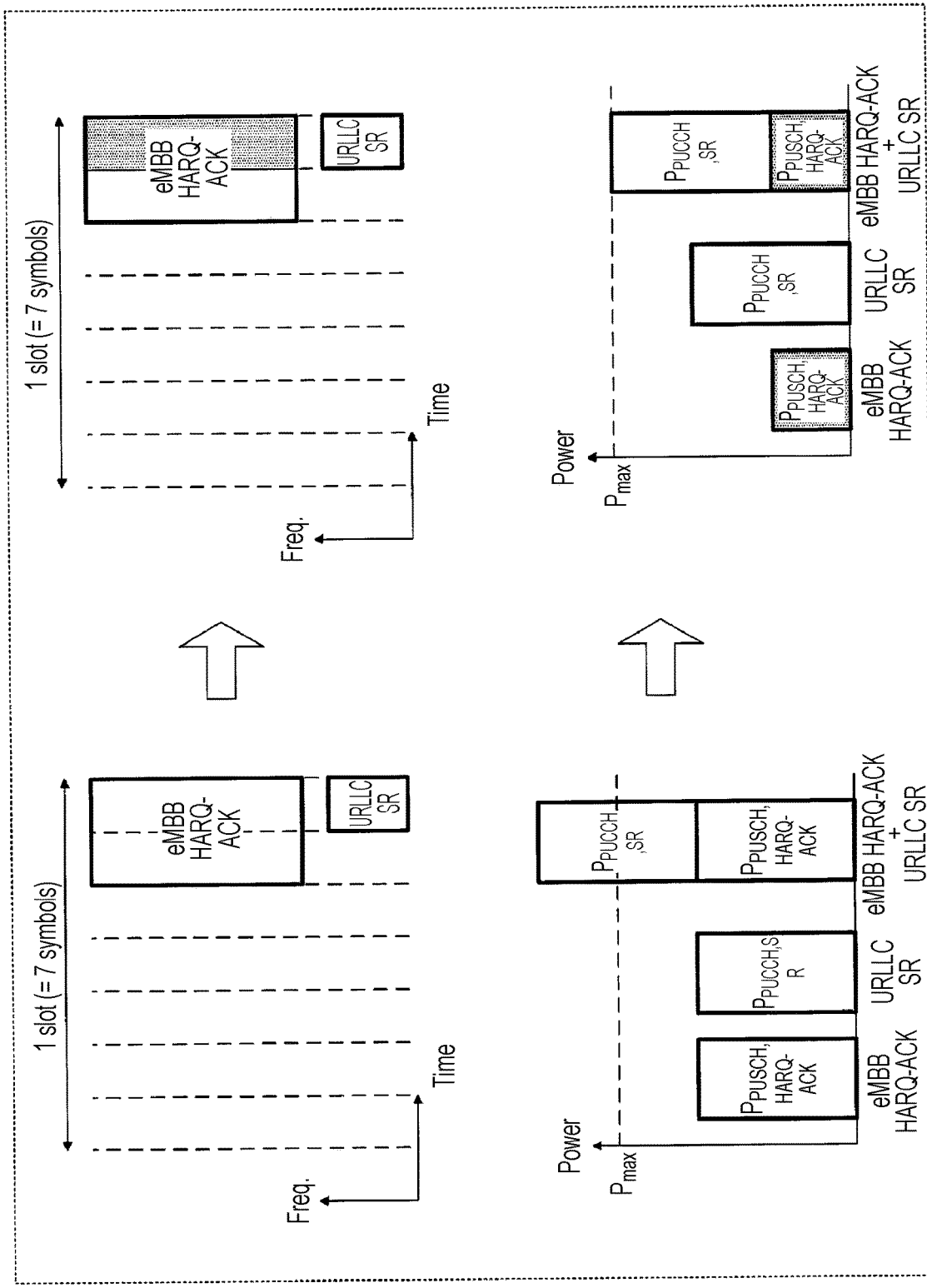
FIG. 7 depicts an example of transmission control according to embodiment 1.

In a case where it is determined that "power scaling is required" (ST103: yes), the terminal 200 carries out power scaling for the PUCCHs (ST104). At such time, the terminal 200 (control unit 209) carries out power scaling with the quality of the URLLC SR being prioritized over the quality of the eMBB HARQ-ACK. That is, the terminal 200 actively carries out power scaling for the eMBB HARQ-ACK compared to the URLLC SR. For example, in an interval in which the transmissions of the URLLC SR and the eMBB HARQ-ACK overlap (the last symbol within the slot in FIG. 7), the terminal 200 carries out power scaling for the PUCCH that transmits the eMBB HARQ-ACK and does not carry out power scaling for the PUCCH that transmits the URLLC SR, as depicted in FIG. 7. For example, the terminal 200 may carry out power scaling for the PUCCH that transmits the eMBB HARQ-ACK, in accordance with the method given in the following formula (1).

$$P_{PUCCH,\ HARQ\text{-}ACK,\ tx} = P_{max} - P_{PUCCH,\ SR} \quad (1)$$

Here, $P_{PUCCH,\ HARQ\text{-}ACK,\ tx}$ indicates the PUCCH transmission power with which the HARQ-ACK obtained after the power scaling is transmitted, $P_{max}$ indicates the maximum transmission power specific to the terminal, and $P_{PUCCH,\ SR}$ indicates the PUCCH transmission power with which the SR is transmitted.

After power scaling, or in a case where it has been determined that "power scaling is not required" (ST103: no), the terminal 200 transmits a plurality of UCIs including the URLLC SR and the eMBB HARQ-ACK (ST105).

In this way, in the present embodiment, in an overlap interval in which the transmission of an eMBB HARQ-ACK and the transmission of a URLLC SR occur at the same time, in a case where the sum of the transmission power for the URLLC SR and the eMBB HARQ-ACK has exceeded the maximum transmission power of the terminal 200, the terminal 200 carries out power scaling for the PUCCH that transmits the eMBB HARQ-ACK. That is, since power scaling is not carried out for the PUCCH that transmits the URLLC SR, the PUCCH that transmits the URLLC SR is not affected by power scaling. In this way, due to the terminal 200 carrying out power scaling preferentially for a signal other than the URLLC SR, it is possible to assure the transmission quality of the PUCCH that transmits the URLLC SR, and it is possible to satisfy low latency and high reliability for URLLC.

Furthermore, in the present embodiment, the terminal 200 transmits the URLLC SR and the eMBB HARQ-ACK using respectively different PUCCH resources. It is therefore not necessary for the base station 100 to carry out blind detection to determine which of the two resources of an SR resource and an HARQ-ACK resource is being used to transmit a signal such as in LTE. Consequently, according to the present embodiment, it is possible to reduce ambiguity in PUCCH detection, and it is possible to satisfy high reliability for URLLC.

Based on the above, according to the present embodiment, it is possible to appropriately carry out radio resource control for a plurality of UCIs transmitted at the same time by means of PUCCHs.

In FIG. 7, a description has been given regarding a case where a transmission interval for a URLLC SR and a transmission interval for an eMBB HARQ-ACK partially overlap; however, it should be noted that the terminal 200 may apply the same power scaling across the entire transmission interval for the eMBB HARQ-ACK in a case where the transmission interval for the eMBB HARQ-ACK entirely overlaps the transmission interval for the URLLC SR.

Here, in a case where power scaling occurs, a transient period is required between a symbol in which power scaling is applied and a symbol in which power scaling is not applied. Furthermore, deterioration in signal quality is feasible in symbols that include a transient period.

In contrast, if the same power scaling is applied across the entire transmission interval for the eMBB HARQ-ACK, a transient period is not required, and it is possible to avoid deterioration in signal quality.

Embodiment 2

The base station and the terminal according to the present embodiment have basic configurations that are common to those of the base station 100 and the terminal 200 according to embodiment 1, and will therefore be described with reference to FIGS. 3 and 4.

In the present embodiment, it is assumed that the terminal 200 transmits a URLLC SR using a short PUCCH having one or two symbols, and transmits an eMBB HARQ-ACK using a PUCCH having a greater number of symbols than the URLLC SR.

Figure 8:
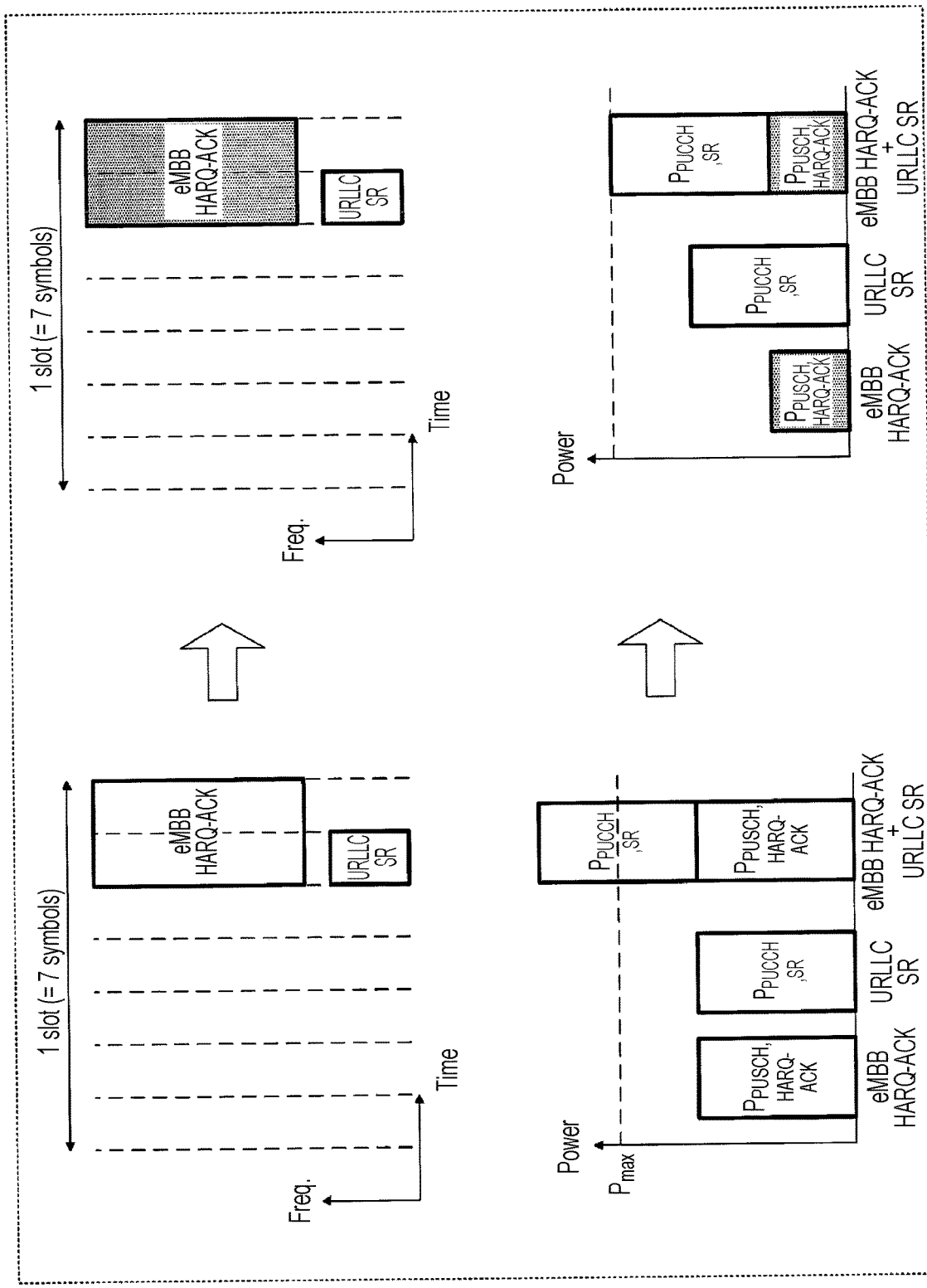
FIG. 8 depicts an example of transmission control according to embodiment 2.

Here, there are cases where a transmission of a URLLC SR and a transmission of an eMBB HARQ-ACK occur at the same time, as depicted in FIG. 8. In FIG. 8, one symbol (transmission start position) at the beginning of a PUCCH that transmits an eMBB HARQ-ACK and a PUCCH symbol that transmits a URLLC SR overlap.

Furthermore, in the present embodiment, similar to embodiment 1, it is assumed that the URLLC SR and the eMBB HARQ-ACK are allocated to different PUCCH resources, as depicted in FIG. 8. That is, in a case where the transmission of a URLLC SR and the transmission of an eMBB HARQ-ACK have occurred at the same time (in the same symbol), the terminal 200 simultaneously transmits (transmits in an FDM manner) a plurality of UCIs (namely, the URLLC SR and the eMBB HARQ-ACK) allocated to different PUCCH resources.

Furthermore, similar to embodiment 1, the terminal 200 calculates the sum of the transmission power (total transmission power) from transmission power values of the PUCCHs for each of the URLLC SR and the eMBB HARQ-ACK, and determines whether or not power scaling is required by comparing the calculated total transmission power and the maximum transmission power ($P_{max}$) specific to the terminal. It should be noted that, as a specific method for calculating transmission power, with LTE-Advanced as an example, the transmission power calculation formula for a PUCCH described in NPL 3 may be used.

In other words, the terminal 200 determines that "power scaling is not required" in a case where the total transmission power is less than or equal to the maximum transmission power specific to the terminal, and determines that "power scaling is required" in a case where the total transmission power exceeds the maximum transmission power specific to the terminal.

Then, similar to embodiment 1, the terminal 200 carries out power scaling for a PUCCH when having determined that "power scaling is required". At such time, in the present embodiment, the terminal 200 carries out power scaling with the quality of the URLLC SR being prioritized over the quality of the eMBB HARQ-ACK. That is, similar to embodiment 1, the terminal 200 actively carries out power scaling for the eMBB HARQ-ACK compared to the URLLC SR. For example, the terminal 200 carries out power scaling for the PUCCH that transmits the eMBB HARQ-ACK and does not carry out power scaling for the PUCCH that transmits the URLLC SR, as depicted in FIG. 8.

Furthermore, in the present embodiment, in a case where power scaling is required, the terminal 200 carries out power scaling for all PUCCH symbols in which the eMBB HARQ-ACK is transmitted, as depicted in FIG. 8. For example, the terminal 200 may carry out power scaling for all PUCCH symbols in which the eMBB HARQ-ACK is transmitted, in accordance with the method given in formula Here, as mentioned above, in a case where power scaling occurs, a transient period is required between symbols in which power scaling occurs, and deterioration in signal quality is feasible. In particular, the effect of signal quality deterioration brought about by a transient period increases in a case where few symbols are allocated to the PUCCH (for example, the case where one or two symbols are transmitted) such as that depicted in FIG. 8.

In contrast, in embodiment 2, the terminal 200 applies the same power scaling to the entire interval for the PUCCH that transmits the eMBB HARQ-ACK (including the interval that overlaps with the transmission interval for the URLLC SR), and it is thereby possible to prevent a transient period occurring in the PUCCH transmission interval in which the eMBB HARQ-ACK is transmitted.

In this way, in the present embodiment, similar to embodiment 1, in a case where the sum of the transmission power for the URLLC SR and the eMBB HARQ-ACK has exceeded the maximum transmission power of the terminal 200, the terminal 200 carries out power scaling for the PUCCH that transmits the eMBB HARQ-ACK. That is, since power scaling is not carried out for the PUCCH that transmits the URLLC SR, the PUCCH that transmits the URLLC SR is not affected by power scaling. Thus, according to the present embodiment, it is possible to assure the transmission quality of the PUCCH that transmits the URLLC SR, and it is possible to satisfy low latency and high reliability for URLLC.

Furthermore, in the present embodiment, similar to embodiment 1, the terminal 200 transmits the URLLC SR and the eMBB HARQ-ACK using respectively different PUCCH resources. It is therefore not necessary for the base station 100 to carry out blind detection to determine which of the two resources of an SR resource and an HARQ-ACK resource is being used to transmit a signal such as in LTE. Consequently, according to the present embodiment, it is possible to reduce ambiguity in PUCCH detection, and it is possible to satisfy high reliability for URLLC.

Furthermore, in the present embodiment, it is assumed that the transmission interval for the eMBB HARQ-ACK is longer than the transmission interval for the URLLC SR, and at least the transmission start position of the transmission interval for the eMBB HARQ-ACK is included in an overlap interval in which the transmission of the eMBB HARQ-ACK and the transmission of the URLLC SR occur at the same time, and the terminal 200 carries out power scaling for the eMBB HARQ-ACK across the entire transmission interval for the eMBB HARQ-ACK in a case where the sum of the transmission power for the PUCCHs exceeds the maximum transmission power in the overlap interval.

It is thereby possible to prevent a transient period occurring in the transmission interval for the PUCCH that transmits the eMBB HARQ-ACK.

Based on the above, according to the present embodiment, similar to embodiment 1, it is possible to appropriately carry out radio resource control for a plurality of UCIs transmitted at the same time by means of PUCCHs.

Embodiment 3

The base station and the terminal according to the present embodiment have basic configurations that are common to those of the base station 100 and the terminal 200 according to embodiment 1, and will therefore be described with reference to FIGS. 3 and 4.

In the present embodiment, it is assumed that the terminal 200 transmits a URLLC SR using a short PUCCH having one symbol, and transmits an eMBB HARQ-ACK using a short PUCCH having two symbols.

Here, similar to embodiment 2 (for example, see FIG. 8), there are cases where a transmission interval for a URLLC SR and a transmission interval for an eMBB HARQ-ACK partially overlap.

Furthermore, in the present embodiment, similar to embodiments 1 and 2, it is assumed that the URLLC SR and the eMBB HARQ-ACK are allocated to different PUCCH resources. That is, in a case where the transmission of a URLLC SR and the transmission of an eMBB HARQ-ACK have occurred at the same time (in the same symbol), the terminal 200 simultaneously transmits (transmits in an FDM manner) a plurality of UCIs (namely, the URLLC SR and the eMBB HARQ-ACK) allocated to different PUCCH resources.

Furthermore, similar to embodiments 1 and 2, the terminal 200 calculates the sum of the transmission power (total transmission power) from transmission power values of the PUCCHs for each of the URLLC SR and the eMBB HARQ-ACK, and determines whether or not power scaling is required by comparing the calculated total transmission power and the maximum transmission power ($P_{max}$) specific to the terminal. It should be noted that, as a specific method for calculating transmission power, with LTE-Advanced as an example, the transmission power calculation formula for a PUCCH described in NPL 3 may be used.

Furthermore, similar to embodiment 2, in a case where power scaling is required, the terminal 200 carries out power scaling for all PUCCH symbols in which the eMBB HARQ-ACK is transmitted. For example, the terminal 200 may carry out power scaling for all PUCCH symbols in which the eMBB HARQ-ACK is transmitted, in accordance with the method given in formula (1).

Here, in the present embodiment, the transmission start position for the eMBB HARQ-ACK (the leading symbol of the transmission interval for the PUCCH) is any timing in the transmission period for the URLLC SR. That is, in the present embodiment, within the PUCCH having two symbols in which the eMBB HARQ-ACK is transmitted, in the leading symbol there is a possibility of the transmission of the URLLC SR and the transmission of the eMBB HARQ-ACK occurring at the same time, whereas in the second symbol there is no possibility of the transmission of the URLLC SR and the transmission of the eMBB HARQ-ACK occurring at the same time.

In this way, by restricting the transmission start symbol for the eMBB HARQ-ACK to the transmission period of the URLLC SR, the URLLC SR no longer occurs in a symbol midway through the PUCCH transmission in which the eMBB HARQ-ACK is transmitted. It is therefore possible to prevent the occurrence of a transient period due to power scaling.

Furthermore, as mentioned above, in the present embodiment, the URLLC SR occurs in the start position (the leading symbol) of the PUCCH transmission in which the eMBB HARQ-ACK is transmitted, and therefore, similar to embodiment 2, the terminal 200 carries out power scaling for the eMBB HARQ-ACK in the entire transmission interval in a case where power scaling is required. It is thereby possible to prevent a transient period occurring in the PUCCH transmission interval in which the eMBB HARQ-ACK is transmitted.

(Modified Example of Embodiment 3)

Figure 9:
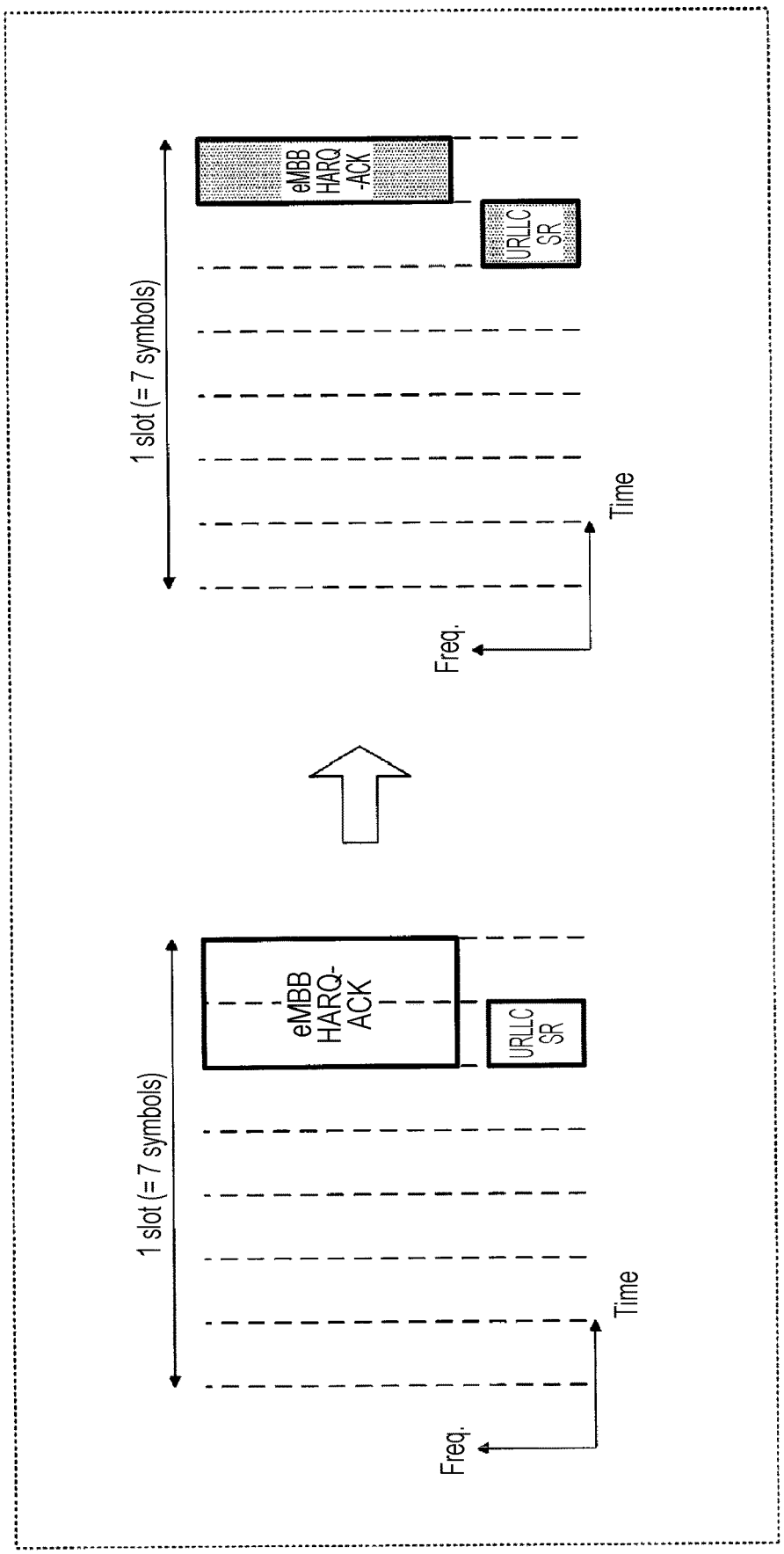
FIG. 9 depicts an example of transmission control according to a modified example of embodiment 3.

It should be noted that, in the present embodiment, the terminal 200 may transmit an HARQ-ACK using an SR resource similar to the LTE method, in a symbol in which the transmission of a URLLC SR and the transmission of an eMBB HARQ-ACK have occurred at the same time (for example, see FIG. 9). Specifically, in the first symbol in which the transmission of a URLLC SR and the transmission of an eMBB HARQ-ACK have occurred at the same time (sixth symbol), depicted in FIG. 9, the terminal 200 transmits an eMBB HARQ-ACK signal using the PUCCH resource with which the URLLC SR is transmitted, and in the second symbol (seventh symbol), transmits an eMBB HARQ-ACK signal using the PUCCH resource with which the eMBB HARQ-ACK is transmitted.

However, in this case, the PUCCH that transmits the eMBB HARQ-ACK is different between the first symbol and the second symbol, as depicted in FIG. 9.

Thus, in the modified example of embodiment 3, as depicted in FIG. 10, in a case where the transmission of a URLLC SR and the transmission of an eMBB HARQ-ACK have occurred at the same time, the terminal 200 may transmit the eMBB HARQ-ACK using the same resource as the PUCCH resource that transmits the URLLC SR, in all symbols that transmit the eMBB HARQ-ACK. In other words, as depicted in FIG. 10, the terminal 200 may transmit the eMBB HARQ-ACK using the same resource as the PUCCH resource that transmits the URLLC SR, in both the first symbol and the second symbol for the eMBB HARQ-ACK.

By doing so, the PUCCH resource no longer changes during the PUCCH interval having two symbols in which the eMBB HARQ-ACK is transmitted. Thus, it is possible to prevent the occurrence of a transient period that is required between symbols in which the PUCCH resource changes, and to avoid deterioration in signal quality.

Furthermore, as depicted in FIGS. 9 and 10, due to the terminal 200 transmitting the eMBB HARQ-ACK using the PUCCH resource for the URLLC SR, a plurality of PUCCHs are no longer transmitted at the same time. Therefore, the possibility of power scaling being carried out for the eMBB HARQ-ACK by the terminal 200 decreases, and it is therefore possible to prevent deterioration in the quality of the eMBB HARQ-ACK caused by power scaling.

It should be noted that, in a case where the terminal 200 transmits the eMBB HARQ-ACK using the PUCCH resource for the URLLC SR, it becomes necessary for the base station 100 to carry out blind detection to determine which of the PUCCH resource for the URLLC SR and the PUCCH resource for the eMBB HARQ-ACK is being used to transmit the signal (eMBB HARQ-ACK), similar to LTE. However, for example, depending on the communication state such as when the communication quality of the PUCCH resource for the URLLC SR is good, it becomes less likely for there to be an effect from ambiguity caused by the blind detection carried out by the base station 100, and it is possible to maintain the high reliability of URLLC.

Embodiments of the present disclosure have been described hereinabove.

Other Embodiments (1) As mentioned above, as required conditions for URLLC defined by 3GPP, it is necessary to guarantee user plane latency of 0.5 ms or less one way and constant reliability and to achieve latency of 1 ms or less. In order to satisfy the aforementioned required conditions for URLLC, it is necessary to be able to transmit a URLLC SR every 0.125 ms.

Here, in the case of subcarrier spacing of 15 kHz, the minimum number of symbols for a long PUCCH is four symbols, and the transmission interval therefor is greater than 0.125 ms. Consequently, the required conditions for URLLC cannot be satisfied with a long PUCCH. Therefore, in a case where subcarrier spacing of 15 kHz is used, the transmission of a URLLC SR may be limited to short PUCCHs.

However, in the case of subcarrier spacing of 60 kHz, the slot length of one slot (=seven symbols) is 0.125 ms. Thus, in a case where subcarrier spacing of 60 kHz is used, it is also possible to use a long PUCCH for the transmission of a URLLC SR.

Furthermore, in the case of subcarrier spacing of 60 kHz, if the transmission period for a URLLC SR is set to a granularity having one-slot units, the transmission period for a URLLC SR becomes equal to the scheduling granularity (one slot) for an eMBB. This is similar to the relationship between the granularity of one subframe unit that is the transmission period for an SR in LTE and the granularity of an HARQ-ACK (one slot). Consequently, in the case of subcarrier spacing of 60 kHz, it is also possible to use a method similar to LTE. That is, in a case where the transmission of an SR has occurred at the same time as the transmission of an HARQ-ACK, the terminal 200 may transmit the HARQ-ACK using the SR resource.

Based on the above, the terminal 200 may switch between the methods described in embodiments 1 and 2 and the LTE method in accordance with the subcarrier spacing. That is, the methods described in embodiments 1 and 2 may be applied in a case where the subcarrier spacing is 15 kHz or 30 kHz, and the LTE method may be applied in a case where the subcarrier spacing is 60 kHz or more.

(2) In the aforementioned embodiments, a description was given regarding a URLLC SR and an eMBB HARQ-ACK as signals that are generated at the same time in the terminal 200. However, there is no restriction to a URLLC SR and the signal may be a signal for which low latency and high reliability are required more than for another signal that is generated at the same time. For example, the signal may be another uplink signal of URLLC. Furthermore, there is no restriction to an eMBB HARQ-ACK and the signal may be another uplink signal (for example, a CSI or an SR or the like).

(3) In the aforementioned embodiments, as an example of transmission power control, a description was given regarding a case where the terminal 200 carries out power scaling for an eMBB HARQ-ACK and does not carry out power scaling for a URLLC SR. However, the transmission power control is not restricted thereto, and power scaling may be carried out for both an eMBB HARQ-ACK and a URLLC SR in such a way that power scaling is carried out with the quality of the URLLC SR being prioritized over the quality of the eMBB HARQ-ACK. That is, the terminal 200 may carry out power scaling also for the URLLC SR while actively carrying out power scaling for the eMBB HARQ-ACK. For example, it is sufficient for the amount of reduction in the transmission power brought about by power scaling for the URLLC SR to be less than the amount of reduction in the transmission power brought about by power scaling for the eMBB HARQ-ACK. The terminal 200 is thereby able to transmit a plurality of UCIs (the URLLC SR and the eMBB HARQ-ACK) at the same time while maintaining low latency and high reliability for the URLLC SR. Furthermore, as an example of transmission power control, dropping may be applied. That is, the terminal 200 may set the transmission power for the eMBB HARQ-ACK to zero. The terminal 200 is thereby able to suppress an increase in the maximum-transmission-power-to-average-power-ratio (PAPR) caused by carrying out FDM transmission of a plurality of UCIs, while maintaining low latency and high reliability for the URLLC SR. Furthermore, in the aforementioned embodiments, a description has been given regarding a case where the terminal 200 carries out power scaling when "power scaling is required". However, power scaling may ordinarily be carried out in a case where an uplink signal of URLLC and an uplink signal of eMBB are generated at the same time in the terminal 200. The terminal 200 is thereby able to maintain low latency and high reliability for a URLLC SR without there being an increase in transmission power.

(4) It is possible for the present disclosure to be realized by means of software, hardware, or software in cooperation with hardware. Each functional block used in the description of the aforementioned embodiments may be partially or entirely realized as an LSI, which is an integrated circuit, and each process described in the aforementioned embodiments may be partially or entirely controlled by one LSI or a combination of LSIs. The LSIs may be configured from individual chips or may be configured from one chip so as to include some or all of the functional blocks. The LSIs may be provided with a data input and output. The LSIs are also referred to as ICs, system LSIs, super LSIs, or ultra LSIs depending on differences in the degree of integration. The circuit integration technique is not limited to an LSI, and may be realized using a dedicated circuit, a general-purpose processor, or a dedicated processor. Furthermore, after an LSI has been manufactured, an FPGA (field-programmable gate array) that can be programmed, or a reconfigurable processor with which the connections and settings of circuit cells within the LSI can be reconfigured, may be used. The present disclosure may be realized as digital processing or analog processing. In addition, if circuit integration technology that replaces LSI appears as a result of another technology that is an advancement in semiconductor technology or is derived therefrom, naturally, the other technology may be used to carry out the integration of functional blocks. Biotechnology applications and the like are also a possibility.

A terminal of an embodiment of the present disclosure is provided with: a circuit that, in a case where the sum of the transmission power for a first signal and the transmission power for a second signal requiring lower latency and higher reliability than the first signal exceeds the maximum transmission power in an overlap interval in which a transmission of the first signal and a transmission of the second signal occur at the same time, carries out power scaling with the quality of the second signal being prioritized over the quality of the first signal, in at least the overlap interval; and a transmitter that transmits the first signal and the second signal obtained after the power scaling.

In the terminal of the present disclosure, the circuit carries out the power scaling for the first signal and does not carry out the power scaling for the second signal in a case where the sum exceeds the maximum transmission power.

In the terminal of the present disclosure, the first signal and the second signal are respectively allocated to different frequency resources.

In the terminal of the present disclosure, a transmission interval for the first signal is longer than a transmission interval for the second signal, and a transmission start position for the first signal is included in the overlap interval, and the circuit carries out the power scaling for the first signal across the entire transmission interval for the first signal in a case where the sum exceeds the maximum transmission power in the overlap interval.

In the terminal of the present disclosure, a start position of a transmission interval for the first signal is any timing in a transmission period for the second signal.

In the terminal of the present disclosure, the transmitter transmits the first signal using a frequency resource for the second signal.

A communication method of the present disclosure includes: in a case where the sum of the transmission power for a first signal and the transmission power for a second signal requiring lower latency and higher reliability than the first signal exceeds the maximum transmission power in an overlap interval in which a transmission of the first signal and a transmission of the second signal occur at the same time, carrying out power scaling with the quality of the second signal being prioritized over the quality of the first signal, in at least the overlap interval; and transmitting the first signal and the second signal obtained after the power scaling.

An embodiment of the present disclosure is useful in a mobile communication system.

REFERENCE SIGNS LIST

100 Base station
101, 209 Control unit
102 Data generation unit
103, 107, 110, 213 Encoding unit
104 Retransmission control unit
105, 108, 111, 211, 214 Modulation unit
106 Higher layer control signal generation unit
109 Downlink control signal generation unit
112, 215 Signal allocation unit
113, 216 IFFT unit
114, 217 Transmission unit
115, 201 Antenna
116, 202 Reception unit
117, 203 FFT unit
118, 204 Extraction unit
119 SR detection unit
120 PUCCH demodulation/decoding unit
121 Determination unit
200 Terminal
205 Downlink control signal demodulation unit
206 Higher layer control signal demodulation unit
207 Downlink data signal demodulation unit
208 Error detection unit
210 SR generation unit
212 ACK/NACK generation unit

The invention claimed is:

1. A terminal provided with:
circuitry, which, in operation, in a case where a sum of a transmission power of an enhanced mobile broadband (eMBB) HARQ-ACK signal and a transmission power of an ultra-reliable and low latency communication (URLLC) scheduling request (SR) signal requiring lower latency and higher reliability than the eMBB HARQ-ACK signal exceeds a maximum transmission power in an overlap interval in which a transmission of the eMBB HARQ-ACK signal and a transmission of the URLLC SR signal occur at the same time, carries out power scaling with quality of the URLLC SR signal being prioritized over quality of the eMBB HARQ-ACK signal, wherein the circuitry, in a case where a transmission interval of the eMBB HARQ-ACK signal is longer than a transmission interval of the URLLC SR signal, and a transmission start position of the eMBB HARQ-ACK signal is included in the overlap interval, is capable of performing:

a first operation of carrying out the power scaling of the eMBB HARQ-ACK signal across the entire transmission interval of the eMBB HARQ-ACK signal, wherein the entire transmission interval includes both the overlap interval during which the sum exceeds the maximum transmission power and a non-overlap interval during which the sum does not exceed the maximum transmission power; and a second operation of selecting URLLC SR signal resources intended to transmit the URLLC SR signal across the entire transmission interval of the eMBB HARQ-ACK signal; and a transmitter, which, in the first operation, transmits the eMBB HARQ-ACK signal and the URLLC SR signal obtained after the power scaling and, in the second operation, transmits both the eMBB HARQ-ACK signal and the URLLC SR signal in each of the URLLC SR signal resources, wherein in a case of subcarrier spacing of 15 kHz or 30 kHz, the first operation is performed, and in a case of subcarrier spacing of 60 kHz or more, the second operation is performed.

2. The terminal according to claim 1,
wherein the circuitry, in the first operation, carries out the power scaling of the eMBB HARQ-ACK signal and does not carry out the power scaling of the URLLC SR signal.

3. The terminal according to claim 1,
wherein the eMBB HARQ-ACK signal and the URLLC SR signal are respectively allocated to different frequency resources in the first operation.

4. The terminal according to claim 1,
wherein the power scaling of the eMBB HARQ-ACK signal across the entire transmission interval of the eMBB HARQ-ACK signal in the first operation prevents occurrence of a transient period in the transmission interval of the eMBB HARQ-ACK signal.

5. The terminal according to claim 1,
wherein the transmission start position of the eMBB HARQ-ACK signal is at a timing in a transmission period of the URLLC SR signal.

6. The terminal according to claim 1,
wherein the selection of the URLLC SR signal resources across the entire transmission interval of the eMBB HARQ-ACK signal in the second operation prevents occurrence of a transient period in the transmission interval of the eMBB HARQ-ACK signal.

7. The terminal according to claim 1, wherein
the transmission of the URLLC SR signal uses-a short PUCCHs (physical uplink control channels) in which a PUCCH is transmitted using one or two symbols within one slot, and
the transmission of the eMBB HARQ-ACK signal uses a PUCCH having a greater number of symbols than the URLLC SR signal.

8. A communication method performed by a terminal, the communication method including:
carrying out power scaling with quality of an ultra-reliable and low latency communication (URLLC) scheduling request (SR) signal being prioritized over quality of an enhanced mobile broadband (eMBB) HARQ-ACK signal, in a case where a sum of a transmission power of the eMBB HARQ-ACK signal and a transmission power of the URLLC SR signal requiring lower latency and higher reliability than the eMBB HARQ-ACK signal exceeds a maximum transmission power in an overlap interval in which a transmission of the eMBB HARQ-ACK signal and a transmission of the URLLC SR signal occur at the same time;
performing a first operation or a second operation, in a case where a transmission interval of the eMBB HARQ-ACK signal is longer than a transmission interval of the URLLC SR signal, and a transmission start position of the eMBB HARQ-ACK signal is included in the overlap interval, wherein:
the first operation includes carrying out the power scaling of the eMBB HARQ-ACK signal across the entire transmission interval of the eMBB HARQ-ACK signal, wherein the entire transmission interval includes both the overlap interval during which the sum exceeds the maximum transmission power and a non-overlap interval during which the sum does not exceed the maximum transmission power; and
the second operation includes selecting URLLC SR signal resources intended to transmit the URLLC SR signal across the entire transmission interval of the eMBB HARQ-ACK signal; and
transmitting, in the first operation, the eMBB HARQ-ACK signal and the URLLC SR signal obtained after the power scaling and transmitting, in the second operation, both the eMBB HARQ-ACK signal and the URLLC SR signal in each of the URLLC SR signal resources,
wherein
in a case of subcarrier spacing of 15 kHz or 30 kHz, the first operation is performed, and
in a case of subcarrier spacing of 60 kHz or more, the second operation is performed.

9. The communication method according to claim 8,
wherein, in the first operation, the power scaling of the eMBB HARQ-ACK signal is carried out and the power scaling of the URLLC SR signal is not carried out.

10. The communication method according to claim 8,
wherein the eMBB HARQ-ACK signal and the URLLC SR signal are respectively allocated to different frequency resources in the first operation.

11. The communication method according to claim 8,
wherein the power scaling of the eMBB HARQ-ACK signal across the entire transmission interval of the eMBB HARQ-ACK signal in the first operation prevents occurrence of a transient period in the transmission interval of the eMBB HARQ-ACK signal.

12. The communication method according to claim 8,
wherein the transmission start position of the eMBB HARQ-ACK signal is at a timing in a transmission period of the URLLC SR signal.

13. The communication method according to claim 8,
wherein the selection of the URLLC SR signal resources across the entire transmission interval of the eMBB HARQ-ACK signal in the second operation prevents occurrence of a transient period in the transmission interval of the eMBB HARQ-ACK signal.

14. The communication method according to claim 8,
wherein
the transmission of the URLLC SR signal uses-a short PUCCHs (physical uplink control channels) in which a PUCCH is transmitted using one or two symbols within one slot, and
the transmission of the eMBB HARQ-ACK signal uses a PUCCH having a greater number of symbols than the URLLC SR signal.

15. A communication method performed by a terminal, the communication method including:
carrying out power scaling with quality of an ultra-reliable and low latency communication (URLLC) scheduling request (SR) signal being prioritized over quality of an enhanced mobile broadband (eMBB) HARQ-ACK signal, in a case where a sum of a transmission power of the eMBB HARQ-ACK signal and a transmission power of the URLLC SR signal requiring lower latency and higher reliability than the eMBB HARQ-ACK signal exceeds a maximum transmission power in an overlap interval in which a transmission of the eMBB HARQ-ACK signal and a transmission of the URLLC SR signal occur at the same time;
performing a first operation or a second operation, in a case where a transmission interval of the eMBB HARQ-ACK signal is longer than a transmission interval of the URLLC SR signal, and a transmission start position of the eMBB HARQ-ACK signal is included in the overlap interval, wherein:
the first operation includes carrying out the power scaling of the eMBB HARQ-ACK signal across the entire transmission interval of the eMBB HARQ-ACK signal, wherein the entire transmission interval includes both the overlap interval during which the sum exceeds the maximum transmission power and a non-overlap interval during which the sum does not exceed the maximum transmission power; and the second operation includes selecting URLLC SR signal resources intended to transmit the URLLC SR signal across the entire transmission interval of the eMBB HARQ-ACK signal; and transmitting, in the first operation, the eMBB HARQ-ACK signal and the URLLC SR signal obtained after the power scaling and transmitting, in the second operation, both the eMBB HARQ-ACK signal and the URLLC SR signal in each of the URLLC SR signal resources, wherein in a case of subcarrier spacing of 15 kHz, the transmission of the URLLC SR signal uses short PUCCHs (physical uplink control channels) in which a PUCCH is transmitted using one or two symbols within one slot, and in a case of subcarrier spacing of 60 kHz, the transmission of the URLLC SR signal uses the short PUCCHs or long PUCCHs in which a PUCCH is transmitted using three or more symbols.

16. A terminal provided with:

circuitry, which, in operation, in a case where a sum of a transmission power of an enhanced mobile broadband (eMBB) HARQ-ACK signal and a transmission power of an ultra-reliable and low latency communication (URLLC) scheduling request (SR) signal requiring lower latency and higher reliability than the eMBB HARQ-ACK signal exceeds a maximum transmission power in an overlap interval in which a transmission of the eMBB HARQ-ACK signal and a transmission of the URLLC SR signal occur at the same time, carries out power scaling with quality of the URLLC SR signal being prioritized over quality of the eMBB HARQ-ACK signal, wherein the circuitry, in a case where a transmission interval of the eMBB HARQ-ACK signal is longer than a transmission interval of the URLLC SR signal, and a transmission start position of the eMBB HARQ-ACK signal is included in the overlap interval, is capable of performing:

a first operation of carrying out the power scaling of the eMBB HARQ-ACK signal across the entire transmission interval of the eMBB HARQ-ACK signal, wherein the entire transmission interval includes both the overlap interval during which the sum exceeds the maximum transmission power and a non-overlap interval during which the sum does not exceed the maximum transmission power; and a second operation of selecting URLLC SR signal resources intended to transmit the URLLC SR signal across the entire transmission interval of the eMBB HARQ-ACK signal; and a transmitter, which, in the first operation, transmits the eMBB HARQ-ACK signal and the URLLC SR signal obtained after the power scaling and, in the second operation, transmits both the eMBB HARQ-ACK signal and the URLLC SR signal in each of the URLLC SR signal resources, wherein in a case of subcarrier spacing of 15 kHz, the transmission of the URLLC SR signal uses short PUCCHs (physical uplink control channels) in which a PUCCH is transmitted using one or two symbols within one slot, and in a case of subcarrier spacing of 60 kHz, the transmission of the URLLC SR signal uses the short PUCCHs or long PUCCHs in which a PUCCH is transmitted using three or more symbols.

17. The terminal according to claim 16, wherein the circuitry, in the first operation, carries out the power scaling of the eMBB HARQ-ACK signal and does not carry out the power scaling of the URLLC SR signal.

18. The terminal according to claim 16, wherein the eMBB HARQ-ACK signal and the URLLC SR signal are respectively allocated to different frequency resources in the first operation.

19. The terminal according to claim 16, wherein the power scaling of the eMBB HARQ-ACK signal across the entire transmission interval of the eMBB HARQ-ACK signal in the first operation prevents occurrence of a transient period in the transmission interval of the eMBB HARQ-ACK signal.

20. The terminal according to claim 16, wherein the transmission start position of the eMBB HARQ-ACK signal is at a timing in a transmission period of the URLLC SR signal.

* * * * *